(12) United States Patent
Sills (10) Patent No.: US 7,486,623 B2
(45) Date of Patent: Feb. 3, 2009

(54) METHOD AND SYSTEM FOR SURVEILLING A TELECOMMUNICATIONS NETWORK LINK

(75) Inventor: Daniel J. Sills, Palo Alto, CA (US)

(73) Assignee: General Instrument Corporation, Horsham, PA (US)

( * ) Notice: Subject to any disclaimer, the term of this patent is extended or adjusted under 35 U.S.C. 154(b) by 1007 days.

(21) Appl. No.: 10/845,000

(22) Filed: May 13, 2004

(65) Prior Publication Data

US 2005/0254431 A1    Nov. 17, 2005

(51) Int. Cl.
*G01R 31/08* (2006.01)
*H04J 1/16* (2006.01)
*H04L 12/28* (2006.01)
*H04L 12/56* (2006.01)
*G06F 15/173* (2006.01)
*G06F 11/00* (2006.01)

(52) U.S. Cl. .................. 370/241; 370/242; 370/245; 370/254; 370/401; 370/908; 370/911; 370/912; 709/223; 709/224; 714/1; 714/25; 714/40

(58) Field of Classification Search ............ 370/216, 370/241, 242, 245, 254, 345, 401, 908, 911, 370/912; 709/223, 224; 714/25, 27, 30, 714/31, 1, 40, 43; 379/1.01, 14.01, 15.01, 379/26.01, 26.02
See application file for complete search history.

(56) References Cited

U.S. PATENT DOCUMENTS

| | | | |
|---|---|---|---|
| 4,769,761 A | * | 9/1988 | Downes et al. ............ 709/224 |
| 5,991,264 A | * | 11/1999 | Croslin ..................... 370/225 |
| 6,215,764 B1 | * | 4/2001 | Wey et al. .................. 370/216 |
| 6,282,277 B1 | * | 8/2001 | DeBalko .................. 379/221.02 |
| 6,366,556 B1 | * | 4/2002 | Ballintine et al. ........... 370/216 |
| 6,651,183 B1 | * | 11/2003 | Gensler et al. ................ 714/4 |
| 6,662,308 B1 | * | 12/2003 | Baroni et al. ................. 714/4 |
| 6,880,111 B2 | * | 4/2005 | Fanning ..................... 714/39 |
| 2003/0012129 A1 | * | 1/2003 | Lee et al. .................... 370/216 |
| 2004/0151161 A1 | * | 8/2004 | Casey et al. ................. 370/352 |
| 2005/0022064 A1 | * | 1/2005 | Steinmetz et al. ............ 714/42 |
| 2005/0047566 A1 | * | 3/2005 | Gonikberg ............... 379/93.05 |
| 2005/0069093 A1 | * | 3/2005 | Harrison .................. 379/27.01 |
| 2005/0249123 A1 | * | 11/2005 | Finn ......................... 370/242 |
| 2006/0153070 A1 | * | 7/2006 | DelRegno et al. ........... 370/229 |

\* cited by examiner

*Primary Examiner*—Seema S Rao
*Assistant Examiner*—Xavier Szewai Wong
(74) *Attorney, Agent, or Firm*—Larry T. Cullen (57) ABSTRACT

A method for surveilling a telecommunications network link includes disposing a link demarcation device (LDD) at a point on a network link, the LLD dividing the network link into a first network link section and a second network link section, the LDD being configured to perform self-monitoring and monitoring of the first a network link sections, operating the LDD to transmit one of a plurality of unique fault-indicating signals based upon a specific detected fault-indicating condition, wherein each of the unique fault-indicating signals corresponds to a detected fault-indicating condition, detecting the unique fault-indicating signal with a link delimiting device (LLD) communicatively coupled to the LDD by one of the first and second network link sections, and unambiguously identifying the unique fault-indicating signal with the LLD, wherein the unique fault-indicating signals are selected to be readily distinguishable by an existing detection and alarming capability of the LLD.

7 Claims, 5 Drawing Sheets

METHOD AND SYSTEM FOR SURVEILLING A TELECOMMUNICATIONS NETWORK LINK

FIELD

The present method and system relate to signaling on a network. More particularly, the present method and system provide for monitoring a telecommunications network link by selectively issuing fault-indicating signals from a link demarcation device based on a link delimiting device's detection and alarming capability.

BACKGROUND

In today's business world, reliable and efficient access to information has become an important asset in the quest to achieve a competitive advantage. File cabinets and mountains of papers have given way to computers that store and manage information electronically. Coworkers thousands of miles apart can share information instantaneously, just as hundreds of workers in a single location can simultaneously review research data maintained online.

Figure 1:
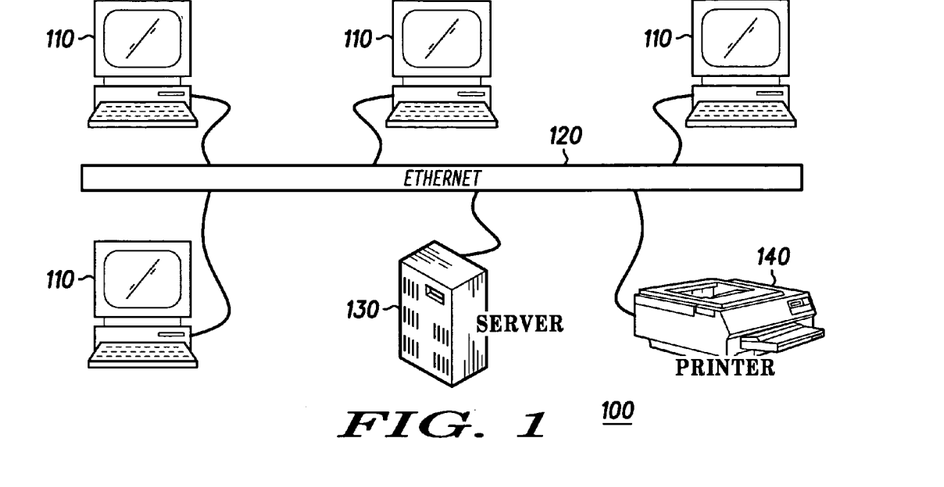
FIG. 1 is a simple block diagram illustrating an Ethernet network.

Computer networking technologies are the glue that binds these elements together. One example of a computer network is known as an Ethernet network as illustrated in FIG. 1. The original Ethernet network described communication over a single cable shared by all devices on the network. Once a device attached to this cable, it had the ability to communicate with any other attached device. This allows the network to expand to accommodate new devices without requiring any modification to those devices already on the network. As illustrated in FIG. 1, the simple Ethernet network (100) may include multiple devices such as computers (110), printers (140), and servers (130) communicatively coupled through an Ethernet medium (120). During operation in a simple Ethernet network (100) such as that illustrated in FIG. 1, a signal placed on the Ethernet medium (120) will reach every attached node or device. A destination address is included in each signal, identifying the intended recipient of each data frame. For example, as illustrated in FIG. 1, when one of the computers (110) transmits to the printer (140), the other computers (110) and the server (130) will also receive and examine the address of the data frame. If the frame is not intended for the receiving component, the data frame will be discarded without examining its contents.

As networks began to expand, and multiple signals were transmitted over the networks (100), switched network systems were developed where each component is attached to the network communication medium via a switch. Even more recently, networks have evolved into what is known as a star topology in which all nodes (workstations or other devices) include individual switches that are directly connected to a common central computer through individual links.

Telecommunications service providers have also adopted the star topology. Often, service providers deploy a link demarcation device at the customer-network interface point which is often located at or near the customer premises. The link demarcation device acts as a physical demarcation point between the customer-owned and maintained infrastructure and the network-owned and maintained infrastructure, while allowing the service provider to isolate troubles to either the network-side of the device or the customer-side of the device. The link demarcation device may also provide a number of capabilities such as media conversion, rate conversion, performance monitoring, etc.

The traditional link demarcation devices that provide fault isolation have been both temporally and resourcefully inefficient. More specifically, to provide fault isolation, the traditional demarcation devices have to be actively managed through a signaling channel which is usually carried via the link that the link demarcation device demarcates, which is resourcefully costly in that it consumes bandwidth on the network link. In order to accommodate the signaling channel, the traditional link demarcation devices include the components and capability used to terminate the signal channel, carried via the network link, and to transmit complex signals, which incrementally increases their cost as well as using precious bandwidth.

Alternatively, the signaling channel could be forged inside the link's overhead to conserve user bandwidth, but this is a non-standard approach that requires deployment of another costly translation device to insert and extract the signaling channel into and out of the link's overhead at or near the link delimiting device. Finally, active management of the demarcation devices, and if needed, the translation device requires costly purpose-built management system software functionality.

SUMMARY

A method for surveilling a telecommunications network link includes disposing a link demarcation device (LDD) at a point on a network link, the LDD dividing the network link into a first network link segment and a second network link segment, the LDD being configured to perform self-monitoring and monitoring of the first and second network link sections, operating the LDD to transmit one of a plurality of unique fault-indicating signals based upon a specific detected fault-indicating condition, wherein each of the unique fault-indicating signals corresponds to a detected fault-indicating condition, detecting the unique fault-indicating signal with a link delimiting device (LLD) communicatively coupled to the LDD by one of the first and second network link sections, and unambiguously identifying the unique fault-indicating signal with the LLD, wherein the unique fault-indicating signals are selected to be readily distinguishable by an existing detection and alarming capability of the LLD.

BRIEF DESCRIPTION OF THE DRAWINGS

The accompanying drawings illustrate various embodiments of the present method and system and are a part of the specification. Together with the following description, the drawings demonstrate and explain the principles of the present method and system. The illustrated embodiments are examples of the present method and system and do not limit the scope thereof.

Throughout the drawings, identical reference numbers designate similar but not necessarily identical elements.

DETAILED DESCRIPTION

The present specification describes a number of exemplary methods and systems for efficiently surveilling telecommunications network links. More specifically, the present method and system leverages solely the inherent functionality of the device which interfaces to the telecommunications network link in order to effect fault isolation on the link. The phrase "leverages solely the inherent functionality" in the present specification and in the appended claims means that the present method and system operates in any manner that effects fault isolation by the extant link delimiting device without requiring that device to be upgraded with any specific fault-isolation-oriented functionality; the present method and system accommodates whatever functionality is inherent to the link delimiting device. The components and methods of the present system will be illustrated in further detail below.

In the present specification and in the appended claims, the term "link delimiting device" or "LLD" is meant to be understood broadly as any combination of hardware, software, or device that interfaces to a network link, enables the provision of telecommunication over the link, has some inherent ability to surveil the status of the link and to generate alarms and status based on condition that it detects on the link, and the ability to transmit signals on the link that are detectable by another device on the link (i.e. control the link in some manner). Accordingly, a link delimiting device may include, but is in no way limited to, a switch such as an Ethernet switch, or an asynchronous transfer mode (ATM) switch; an optical-layer transport apparatus; a synchronous optical network (SONET)-based transport apparatus; a general transport apparatus; an Internet protocol (IP) router; an IP service management apparatus; a subscriber access multiplexer; an aggregator; and/or any other edge equipment; and/or any combination thereof.

Moreover, in the present specification, and in the appended claims, the phrase "network" or "Ethernet network" is meant to be understood broadly as including any series of points or nodes interconnected by communication paths. Networks can interconnect with other networks and contain sub-networks. Networks may be characterized in terms of spatial distance or common topology. Accordingly, the communications path of the present "network" or "Ethernet network" may include, but is in no way limited to, optical fiber, coaxial cable, and/or twisted pair cable.

The term "fault isolation" is meant to be understood broadly as meaning any method for determining whether a fault triggering event occurs on a first or a second side of a link demarcation device. Similarly, the term "liveness query" is meant to be understood broadly as referring to any trouble-shooting method or diagnostic test in which a liveness-querying signal is transmitted to a device whose liveness is being verified, with the expectation that the device under test will respond to the liveness-querying signal with another signal; a positive response indicated the device under test is alive.

In the present specification and appended claims, the term "state machine" is meant to be understood broadly as meaning any device or signaling scheme that stores the status of something at a given time and can operate on input to change the status and/or cause an action or output to take place for any given change. Any computing device may be a state machine by receiving machine instruction that changes one or more states thereby causing other actions to take place. Accordingly, a state machine can be described as an initial state or record, a set of possible input events, a set of new states that may result from the input, and a set of possible actions or output events that result from a new state.

Additionally, the term "orthogonal signal" is meant to be understood broadly as referring to a signal that is readily distinguishable from other signals at a specified component. For example, two orthogonal signals issued by an LDD are readily and unambiguously distinguishable at an LLD.

In the following description, for purposes of explanation, numerous specific details are set forth in order to provide a thorough understanding of the present method and system for efficiently surveilling telecommunications network links. It will be apparent, however, to one skilled in the art that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Overall Structure

Figure 2:
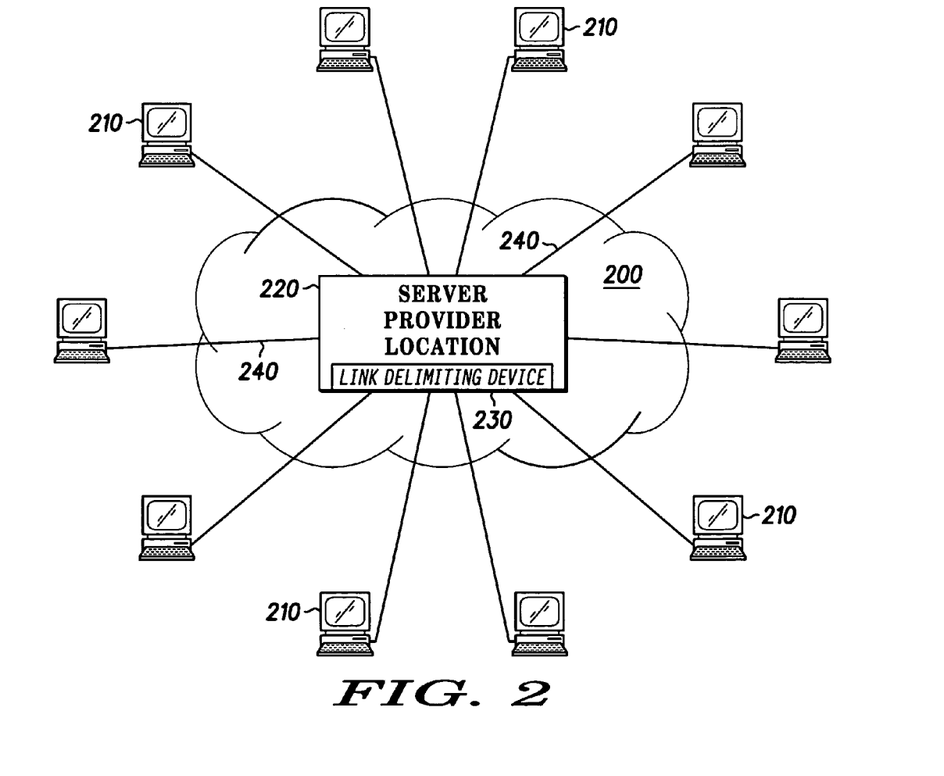
FIG. 2 is a simple block diagram illustrating a star topology network, according to one exemplary embodiment.

While the present system and method may be practiced by any number of telecommunication networks, the present system and method will be described herein, for ease of explanation only, in the context of an Ethernet-based telecommunications network marked by two entities: a service provider which provides services, and a customer. As used in the present specification, for ease of explanation only, the present Ethernet link is used by the service provider to supply services to the customer. Accordingly, FIG. 2 illustrates an Ethernet network (200) having a plurality of customer components (210) coupled to a central service provider location (220) in a star topology. According to one exemplary embodiment, the central service provider location (220) that communicatively couples the plurality of customer components (210) acts as an Internet service provider (ISP). As noted above, the service provider location (220) of the Ethernet network (200) is a place of convergence where data arrives from one or more directions and is forwarded out in one or more directions. Additionally, costly link delimiting devices (230) or LLDs such as an Ethernet service router or other intelligent devices that serve as provider edge equipment are disposed in the service provider location (220). The link delimiting devices (230) are very well managed and host a management interface and management software and constantly surveil interfaces between the Ethernet network (200) and the communicatively coupled customer components (210). By necessity, the LLDs (230) have an inherent ability to surveil the status of network links and to generate alarms and status based on conditions that the LLD detects on the link.

As illustrated in FIG. 2, one or more links (240) are extended from the service provider location (220) to each customer location where they interface with a customer component (210). While the present system and method are described in the context of an Ethernet network link (240) serving as the Ethernet medium (120; FIG. 1), any number of communications mediums may be used to communicatively couple the customer components (210) and the service provider location (220) including, but in no way limited to, fiber optic cable, twisted pair cable, co-axial cable, wireless communication mediums, and/or appropriate combinations thereof.

Figure 3:
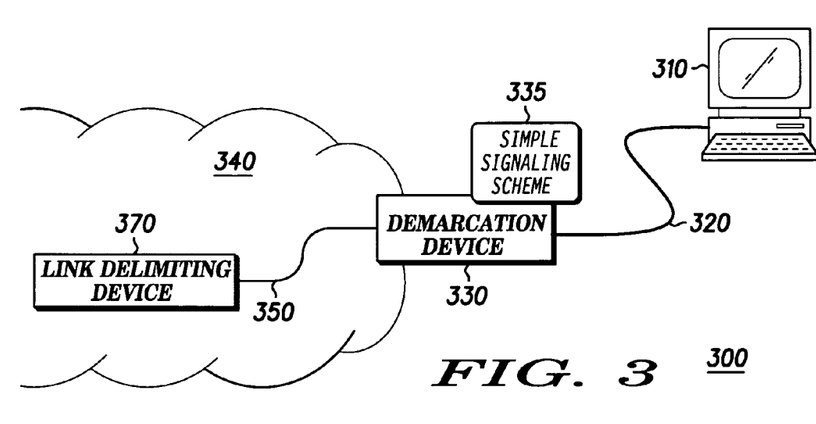
FIG. 3 is a simple block diagram illustrating an efficient signaling system, according to one exemplary embodiment.

FIG. 3 further illustrates the connection between the LLD (370) and a customer component (310) in an efficient signaling system (300), according to one exemplary embodiment. As illustrated in FIG. 3, a link demarcation device (330), or LDD, is placed between a first link (350), stemming from the link delimiting device (370) or LLD to the LDD (330), and a second link (320), leading from the LDD (330) to the customer component (310). As noted above, the link demarcation device (330) separates the service provider network (340) from the customer-responsible components at a point referred to herein as the customer/network interface point. According to this exemplary embodiment, the Ethernet network components include the LDD (330), the first link (350) and any components on the LLD side of the LDD, including, but in no way limited to, the LLD (370). Data transmission from the LLD (370) towards the customer component (310) is referred to herein as downstream communication. The remaining components: the second link (320) leading from the LDD (330) and the customer component (310) is referred to herein as the customer-responsible components. Data transmission from the customer component (310) towards the LLD (370) is referred to herein as upstream communication or an upstream transmission.

As noted above, traditional Ethernet networks often employ LDDs (330) to perform both fault isolation and ancillary liveness query functions. Fault isolation and liveness query functions monitor and identify network problems such as cut or bent fiber (350) lines as well as component and processing malfunction. According to traditional systems and methods, the demarcation devices used to provide the fault isolation and liveness query functions were both complex and expensive. According to one traditional embodiment, the demarcation device may include a router that is monetarily expensive, not easily configured, and must be actively managed.

In contrast to the traditional systems, the present efficient signaling system (300) utilizes the inherent intelligent, surveilling, and management capabilities of the existing LLDs (370) to reduce the complexity and cost of effecting fault isolation. In other words, the fault indicating signals issued by the LDD (330) are selected to be readily detectible by the inherent intelligent, surveilling, and management capabilities of existing LLDs (370). Accordingly, the present signaling system (300) places a simple LDD (330), configured to operate according to a simple signaling scheme (335), at the customer/network interface point separating a signaling link between the LLD (370) and the customer component (310) into a first link (350) leading from the central connection point to the LDD (330) and a second link (320) leading from the LDD (330) and the customer component (310). According to one exemplary embodiment, the LLD (330) is configured to function according to a simple signaling scheme (335) that evaluates a plurality of detected signals or conditions and generates a corresponding signal based upon the detected signals or conditions. The reactive signals may then be interpreted by the LLD (370) to indicate a network condition. Once a network condition is detected by the LLD (370), responsive signals or alarms may be produced by the LLD which can then communicate them to a "management system." As used in the present specification and the appended claims, the term "management system" is meant to be understood broadly as including any management personnel, management software, and/or independent management systems incorporated into a telecommunications network system. As used herein, and in the appended claims, the phrase "simple signaling scheme" is meant to be understood as a signaling scheme that does not require costly and complex fault isolation signaling schemes, which often require active management through a signaling link. According to this exemplary embodiment, use of the simple signaling scheme by the LDD (330) may eliminate the expense of a communication channel or any extra management software and circuitry.

According to the exemplary embodiment illustrated in FIG. 3, the link demarcation device (330) is configured to send fault indicating signals to the LLD in response to certain detected conditions. These fault-indicating signals are selectively generated, on a per-instance basis, to coincide with the surveilling capabilities of the associated LLD (370). The fault-indicating signals are then interpreted by the LLD (370) rather than being transmitted to a traditionally separate management system or management system software. The fault-indicating signals used are "readily detectable." The phrase "readily detectible" shall be interpreted both here and in the appended claims as meaning a signal that the LLD (370) is always able to detect, distinguish, and interpret accurately and without ambiguity, using only the inherent detection and alarming capability of the LLD. Once detected by the LLD (370), the fault-indicating signals are then used to raise an appropriate alarm or set an internal status to reflect the detected condition.

According to one exemplary embodiment, two types of faults may be signaled: network-side faults and customer-side faults. Network-side faults are faults that occur on the network side of the LDD (330). As noted previously, according to one exemplary embodiment, the network side of the LDD (330) includes, but is in no way limited to, the LLD (370), the first link (350), and/or the LDD (330). In contrast, customer-side faults are those faults that occur on the customer side of the LDD (330). As noted previously, according to one exemplary embodiment, the customer-side of the LDD (330) includes, but is in no way limited to, the second link (320) and/or the customer componet(s) (310). Accordingly, a "network fault" signaling state is established when there is a network-side fault, and a "customer fault" signaling state is established when there is a customer side fault.

While the present exemplary embodiment is described in the context of a link demarcation device configured to identify two different conditions and transmit fault indicating signals based on the identified conditions, the present system and method may be used to identify any number of conditions and to transfer corresponding fault indicating signals. For example, a single network entity could separate a first and a second side of a network by a demarcation device and use the present system and method to perform fault isolation in the network. Moreover, while the present exemplary embodiment is described using a service-provider/customer context wherein an LDD identifies and signals two fault conditions, the present system and method may be used to identify more-than-two conditions and in other than the service-provider/customer context. An example of another context would be a network link owned in its entirety and operated by a single entity, such as a university-owned network.

According to the present signaling method, the LDD (330) takes advantage of the inherent capabilities of an extant link delimiting device (370). These include the ability of the LLD (370) to surveil the status of a network link that interconnects the LLD (370) and the LDD (330) and the concomitant ability to detect various conditions on the link, to generate alarms and status based on condition that it detects on the link, and the ability to transmit signals on the link. By taking advantage of the LLD (370) in such a manner, the present system and method avoid unnecessary cost and complexity in the demarcation device, eliminate the need for an in-band signaling channel, eliminate the need for a non-standard channel in the link overhead and a concomitant translation device, and eliminate the need for a purpose-built management system or software. Operation of the LDD (330) as well as its interaction with the LLD (370) will be described in further detail below.

Exemplary Implementation and Operation

Figure 4:
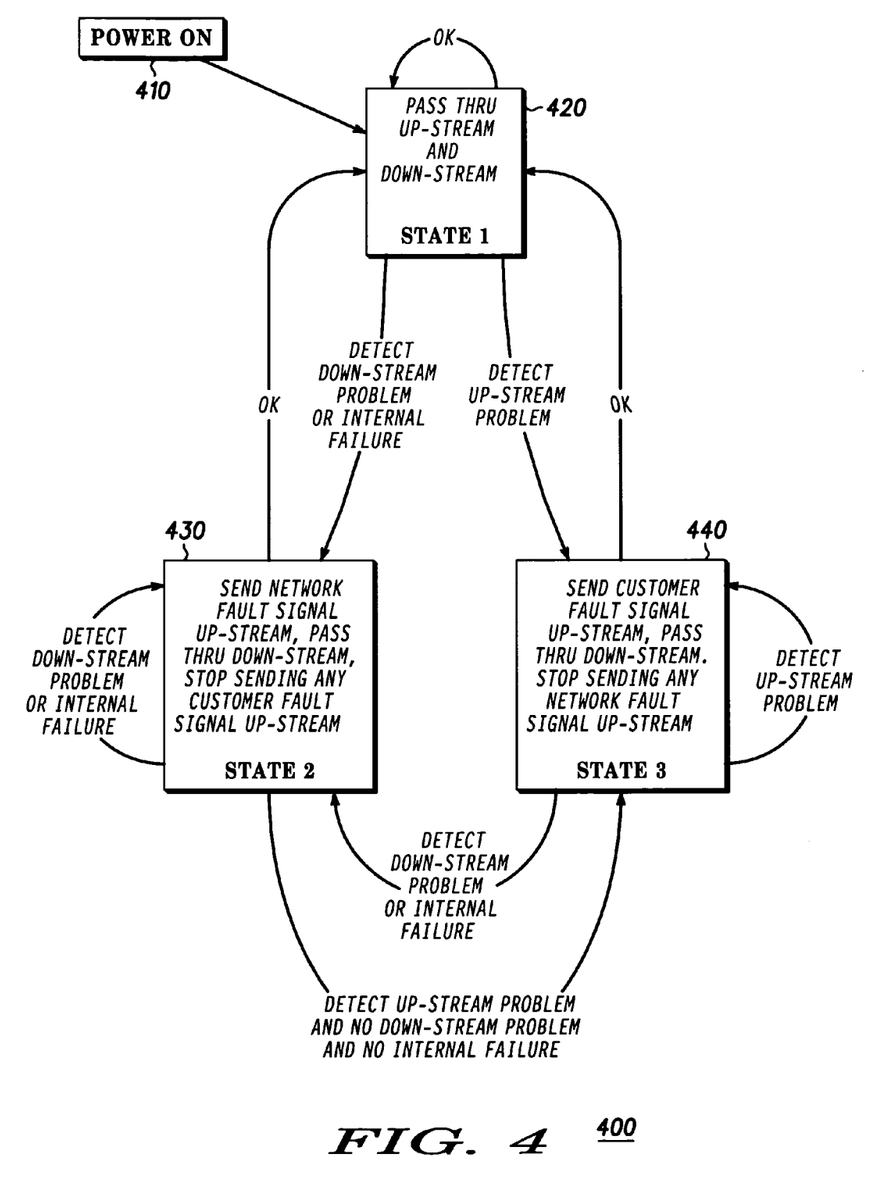
FIG. 4 is a flow chart illustrating the various states of a state machine performing the present efficient signaling method, according to one exemplary embodiment.

FIG. 4 illustrates one exemplary simple signaling scheme (335; FIG. 3) that may be employed by a link demarcation device (330; FIG. 3) performing the present method, according to one exemplary embodiment. As illustrated in FIG. 4, the simple signaling scheme may cause the LDD (330; FIG. 3) to function as a state machine having two fault-indicating signals. While the embodiment illustrated in FIG. 4 illustrates two possible fault-indicating signals, any number of fault indicating signals may be implemented after the same fashion.

As illustrated in FIG. 4, once the demarcation device is powered on (410), the state machine may exist in one of three states depending on the condition of the detected signals. As illustrated, the state machine may be operating in a first state (420) wherein both up-stream and down-stream signals are passed through without the issuance of any fault-indicating signal, a second state (430) where a network fault signal transmitted from the LDD (330; FIG. 3) to the LLD (370; FIG. 3) and the down-stream signal is passed through, or a third state (440) wherein a customer fault signal is transmitted from the LDD (330; FIG. 3) to the LLD (370; FIG. 3) and the down-stream signal is passed through.

According to the exemplary embodiment illustrated in FIG. 4, if neither up-stream nor down-stream problems are detected by the link demarcation device (330; FIG. 3), the state machine signaling scheme operates according to state 1 (420). In this state, the link demarcation device (330; FIG. 3) operates in the quiescent state in which no fault-indicating signal is issued. Rather, the up-stream and down-stream signals are passed through uninterrupted. That is, according to the present exemplary embodiment, the LDD (330; FIG. 3) does not change any LLD-sourced signals that are destined to the customer component (310) and the LDD does not change any customer component signals that are destined for the LLD (370; FIG. 3). Consequently, no system problems are detected or signaled by either the link demarcation device (330; FIG. 3) or the link delimiting devices (370; FIG. 3)

If, however, a down-stream problem or an internal failure is detected within the link demarcation device (330; FIG. 3), the state machine signaling scheme will operate according to state 2 (430). As illustrated in FIG. 4, state 2 (430) is initiated by the detection of a down-stream problem or internal failure within the LDD (330; FIG. 3). According to this exemplary embodiment, the detection of any problems with the LLD (370; FIG. 3), the first link (350; FIG. 3), or the LDD (330; FIG. 3) will initiate state 2 (430). As illustrated in FIG. 4, when the LDD (330; FIG. 3) is operating according to state 2, a network fault signal is transmitted up-stream to the LLD (370; FIG. 3) while the down-stream signal is passed through. That is, any customer fault signal that was previously being transmitted by the LDD (330; FIG. 3) is no longer transmitted upstream to the LLD (370). Rather, the network fault signal is transmitted up-stream. According to this exemplary embodiment, the network fault signal will indicate to the LLD (370) that a problem has occurred in the service provider network (340; FIG. 3) portion of the system.

Similarly, if an up-stream problem is detected by the LDD (330; FIG. 3) performing a state machine signaling scheme (400), the LDD (330; FIG. 3) will operate according to state 3 (440). As illustrated in FIG. 4, when an upstream problem is detected, a customer fault signal will be passed up-stream from the link demarcation device (330; FIG. 3) to the link delimiting devices (370; FIG. 3), while the down-stream signal will be passed through. Consequently, any network fault signals being transmitted upstream will cease. According to this exemplary embodiment, the reception of a customer fault signal in the LLD (370; FIG. 3) will indicate to a network management system that the problem or error causing the alarm condition is occurring in the portion of the system that is defined as the customer-responsible components. While the exemplary state machine signaling scheme (400) is one example of a simple signaling scheme that may be incorporated by the present LDD (330; FIG. 3), any number of simple signaling schemes that utilize the existing surveillance, monitoring, and alarm capabilities of the LLD (370; FIG. 3) may be incorporated by the demarcation device.

Figure 5:
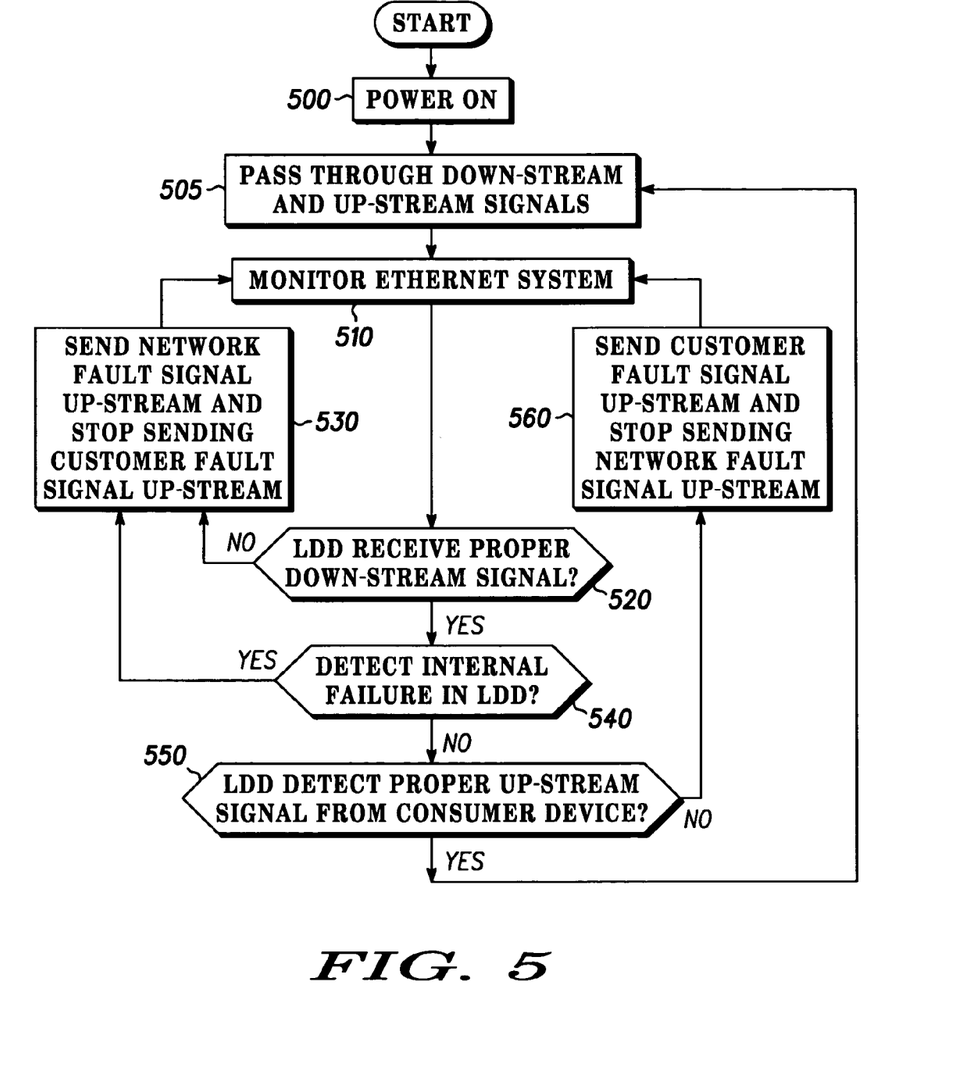
FIG. 5 is a flow chart illustrating a method for efficiently signaling between a remotely located link demarcation device and a remainder of a network, according to one exemplary embodiment.

FIG. 5 further illustrates the operation of the present efficient signaling system (300; FIG. 3), incorporating an LDD (330; FIG. 3) performing a simple signaling scheme (335; FIG. 3), according to one exemplary embodiment. As illustrated in FIG. 5, the present method begins as the system receives power (step 500). Once power has been supplied to the LDD (330; FIG. 3), both downstream and upstream signals are passed through the LDD (step 505) without the issuance of a fault-indicating signal. As the LDD (330; FIG. 3) begins to monitor the Ethernet system (step 510), it monitors the condition or state of received signals. According to one exemplary embodiment, the monitoring of the Ethernet system is performed both by the LDD (330; FIG. 3) operating according to a simple signaling scheme and the LLD (370; FIG. 3) surveilling its interfaces.

At the network end, the costly LLD (370; FIG. 3) is very well managed. Traditionally, a LLD (370; FIG. 3) includes a management interface, management software, and is constantly surveilling its multiple interfaces. Consequently, the LLD (370; FIG. 3) is capable of detecting when there is a loss of signal from one of its interfaces, upon which it will raise an alarm. By taking advantage of the constant surveillance, monitoring, and alarm capabilities of the LLD (370; FIG. 3), such as an Ethernet service router, the present system and method allows for a simplification of the link demarcation device to operate according to a simple signaling scheme thereby eliminating the need for separate signal channeling and its associated costs.

Once the power has been established to both the LLD (370; FIG. 3) and the LDD (330; FIG. 3), the LDD performs its simple signaling scheme (335; FIG. 3) based on perceived signals. According to one exemplary embodiment, the LDD first determines if it is receiving a proper down-stream signal from the LLD (step 520). If no signal is being detected from the LLD (NO, step 520), or the signal being received is not proper in some way, the LDD (330; FIG. 3) transmits a network-fault signal upstream (step 530), indicating a problem with the Ethernet network portion of the system. When the LDD (330; FIG. 3) transmits a network-fault signal, any customer fault signal that was previously being transmitted by the LDD is stopped. Once the network-fault signal has been transmitted to the LLD (370; FIG. 3), the appropriate traps and procedures are executed by the LLD and the system continues to monitor the Ethernet system (step 510).

Once the LDD (330; FIG. 3) has determined that it is receiving a proper downstream signal from the LLD (YES, step 520), the LDD determines whether there are any internal failures in the LDD (step 540). If internal failures are detected within the link demarcation device (YES, step 540) after performing a self-monitoring procedure, a network fault condition is detected and a network fault signal is again sent upstream (step 530) to the LLD (370; FIG. 3) to generate the appropriate remedial action.

However, if no network faults are detected (NO, step 540), the LDD (330; FIG. 3) performing a simple signaling scheme (335; FIG. 3) will determine if the LDD has detected proper upstream signals from the customer device (step 550). If no upstream signals are detected from the customer device, or improper signals are detected from the customer device (NO, step 560), the LDD (330; FIG. 3) generates a customer-fault signal that is sent upstream (step 560), indicating a problem with the customer-responsible components. If the customer fault signal is transmitted upstream from the LDD, any previously transmitted network-fault signals will cease to be transmitted upstream.

If, however, the demarcation device does detect proper upstream signals from the customer device (YES, step 550), everything seems to be working normally and the link demarcation device (330; FIG. 3) operates in a quiescent state. More specifically, when the demarcation device does not detect a downstream problem, an upstream problem, or an internal failure, both the upstream and down stream signals are passed through (step 505) and monitoring continues (step 510). This monitoring process may continue until it is halted at the LLD (370; FIG. 3) or power is removed.

As noted in the exemplary embodiment above, the LDD (330; FIG. 3) may perform its demarcation functions by producing only two different fault signals: the network fault signal and the customer fault signal. Exemplary network fault signals and customer fault signals are selected to be orthogonal to each other and chosen such that the LLD (370; FIG. 3) is unambiguously able to distinguish between the various fault signals and customer fault signals using solely its inherent capabilities. Consequently, regardless of whether the LLD (370; FIG. 3) includes enhanced LLD functionality aimed at monitoring an LDD (330; FIG. 3), the present system and method may select orthogonal or readily detectible fault-indicating signals based on the LLD's detection and alarming capability. Accordingly, the detection and alarming capability of the LLD could vary from an "off the shelf" unit to a highly specialized LLD that is optimized for interoperation with an LDD.

According to one exemplary embodiment, the network fault signal is chosen as an "absence of signal" being transmitted upstream on the first link (350; FIG. 3) from the LDD (330; FIG. 3) to the LLD (370; FIG. 3). In contrast, the customer fault signal may be selected to be a continuous stream of errored Ethernet frames transmitted upstream from the LDD to the LLD.

According to this exemplary embodiment, the selection of an "absence of signal" may be an appropriate network fault signal because the LLD will interpret the absence of signal in the same way as it interprets the result from a break in the first link (350; FIG. 3); such a similar interpretation is ideal because the aforementioned link breakage is also a "network-side" fault. According to the exemplary embodiment illustrated above, the LLD (370; FIG. 3), e.g., a router, will detect the absence of signal condition, generate a "link down" alarm causing this status to be conveyed to on one or more remote management systems and/or have this status displayed on the router's management console, etc.

In contrast, the customer-fault signal is unambiguously orthogonal, from the perspective of the LLD, to the network-fault signal. According to one exemplary embodiment, the customer-fault signal is a sustained transmission of errored Ethernet frames upstream to the link delimiting device (370; FIG. 3). "Errored Ethernet frames" is meant to be understood, according to one exemplary embodiment, as referring to Ethernet frames with invalid checksums.

According to the exemplary embodiment illustrated above the LLD (370; FIG. 3), e.g., a router, will detect the sustained stream of errored Ethernet frames and generate an "errored-frame threshold-crossing" status or alarm causing this status to be conveyed to on one or more remote management systems and/or have this status displayed on the router's management console, etc.

Figure 6:
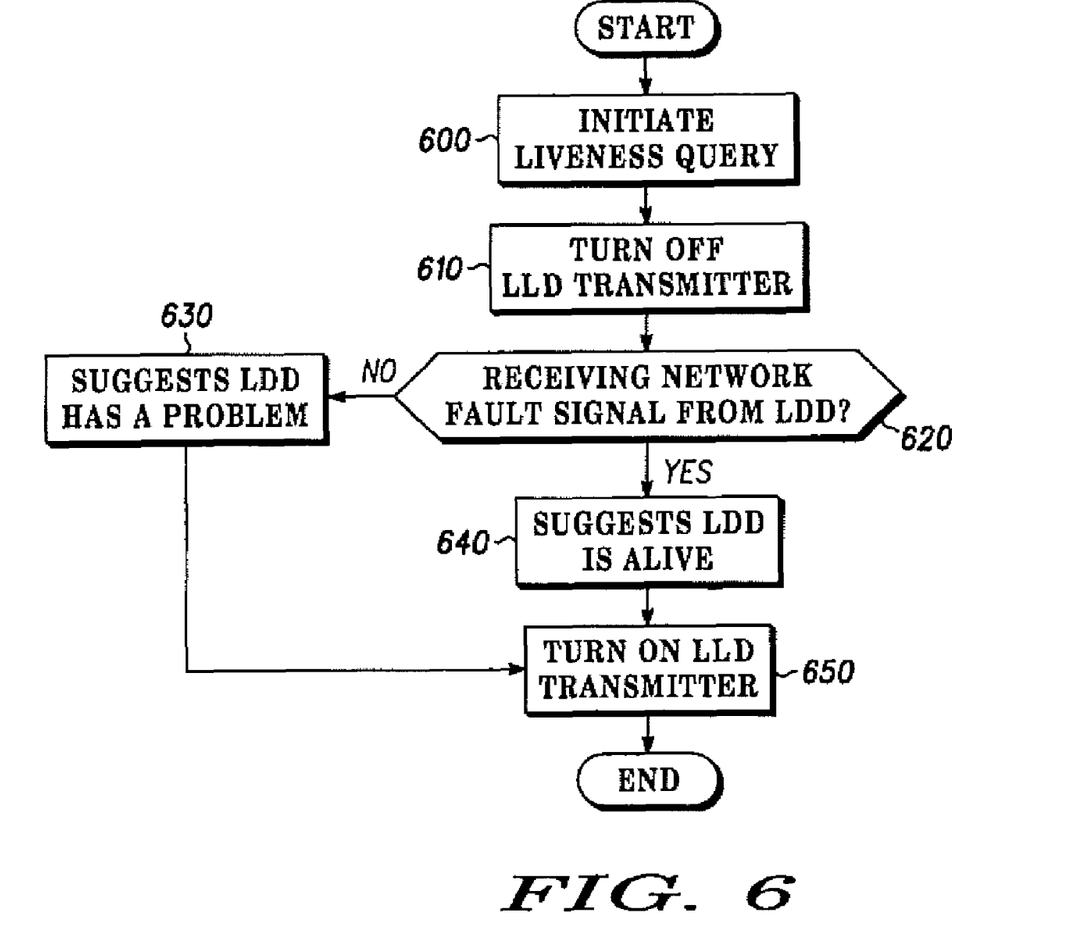
FIG. 6 is a flow chart illustrating a method for performing a liveness query function, according to one exemplary embodiment.

The present signaling method allows for a "liveness query" to be initiated by the LLD (370; FIG. 3) according to the method illustrated in FIG. 6. A liveness query may be performed to acknowledge that the LDD (330; FIG. 3) is "alive." As illustrated in FIG. 6, the liveness query operation is initiated (step 600) in the LLD (370; FIG. 3). Once initiated, the LLD transmitter is turned off (step 610) to simulate a link cut or otherwise defective first link (350; FIG. 3). Additionally, LDD (370; FIG. 3) determines whether it is receiving a network fault signal from the LDD (step 620). If no network fault signal is received from the LLD (NO, step 620) in response to the artificially created defect, an LDD problem is suggested (step 630). If, however, the network fault signal is appropriately received by the LLD (370; FIG. 3) in response to the halting of the LLD transmitter (YES, step 620), the LDD (370; FIG. 3) is functioning properly and is "alive" (step 640). As illustrated in FIG. 6, regardless of whether an LDD problem is suggested, the LLD transmitter is again turned on (step 650) with a better understanding of the performance of the LDD.

The LLD (370; FIG. 3) of the present system and method receives and reacts to the signals received from the LDD (330; FIG. 3) using the existing management software present in the LLD and at the operations center. By reusing the intelligent, surveilling, alarm, and management capabilities of the existing link delimiting device (370; FIG. 3), such as a system router, a switch, or any other device used as an LLD in a network, user bandwidth is preserved, signaling-channel translation devices are obviated, purpose-built management systems and software are obviated, and the link demarcation device (330; FIG. 3) may function according to a simple signaling scheme without the need to be managed.

In conclusion, the present method and system for using the monitoring functionality of a link delimiting device reduces cost and complexity associated with existing signaling methods. More specifically, the present system and method provide for fault isolation and liveness queries between remotely located link demarcation devices and the rest of a network, all the while, reducing bandwidth, component, and management costs.

The preceding description has been presented only to illustrate and describe the present method and system. It is not intended to be exhaustive or to limit the present method and system to any precise form disclosed. Many modifications and variations are possible in light of the above teaching.

The foregoing embodiments were chosen and described in order to illustrate principles of the method and system as well as some practical applications. The preceding description enables others skilled in the art to utilize the method and system in various embodiments and with various modifications as are suited to the particular use contemplated. It is intended that the scope of the method and system be defined by the following claims.

What is claimed is:

1. A method of operating a link demarcation device, in which the link demarcation device performs steps comprising:
    (a) passing data from an upstream network link segment to a downstream network link segment;

(b) passing data from the downstream network link segment to the upstream network link segment;

(c) monitoring for errors on the downstream network link segment;

(d) monitoring for errors on the upstream network link segment;

(e) monitoring for errors in the internal operation of the link demarcation device; (f) halting transmitting data on the upstream network link in response to an error detected by step (c) or step (e); (g) transmitting a continuous stream of erroneous network frames on the upstream network link in response to an error detected in step (d); (h) operating in a first state upon powering the device, in which the device passes data according to steps (a) and (b), the device switches to a second state in response to an error detected in step (c) or step (e), and the device switches to a third state in response to an error detected in step (d); (i) operating in the second state in which upstream data transmission is halted, the device switches to the first state when an error is not detected by any of step (c), step (d) , or step (e), and the device-switches to the third state when an error is detected by step (d) and not by steps (c) or step (e); and (i) operating in the third state in which a stream of erraneous network frames in transmitted on the upstream network link segment, the device switches to the first state when an error is not detected by any of step (c), step(d), or step (e), and the device switches to the second state when an error is detected by step (c) or step (e).

2. The method of operating a link demarcation device according to claim 1, wherein step (d) includes a substep (dl) of detecting a loss of received signal from the upstream network link segment.

3. A method of monitoring a data network, comprising the steps of:

communicatively coupling a link demarcation device to a downstream network link segment and an upstream network link segment; and communicatively coupling a link delimiting device to the upstream network link segment and a management system;

wherein the link demarcation device performs steps comprising:

(a) passing data from the upstream network link segment to the downstream network link segment, (b) passing data from the downstream network link segment to the upstream network link segment, (c) monitoring for errors on the downstream network link segment, (d) monitoring for errors on the upstream network link segment, (e) monitoring for errors in the internal operation of the link demarcation device, (f) halting transmitting data on the upstream network link in response to an error detected by step (c) or step (e), and (g) transmitting a continuous stream of erroneous network frames on the upstream network link in response to an error detected in step (d); and wherein the link delimiting device performs steps comprising:

(1) transmitting and receiving data on the upstream network link segment, (2) transmitting a first alarm to the management system in response to an absence of received data from the upstream network link segment, and (3) transmitting a second alarm, distinguishable from the first alarm, to the management system in response to receiving continuous stream of erroneous network frames on the upstream network link segment, wherein the first alarm indicates a fault is located in the downstream network link segment and the second alarm indicates a fault is located in the link demarcation device or the upstream network link segment.

4. The method of monitoring a data network according to claim 3, further comprising the steps of:

locating the link demarcation device at a customer location; and locating the link delimiting device at a service provider location.

5. The method of monitoring a data netxvork according to claim 4, further comprising the step of:

communicatively coupling a customer maintained data communications device to the link demarcation device;

wherein the link delimiting device and upstream network link segment are maintained by an entity operating the management system.

6. The method of monitoring a data network according to claim 3, wherein the link delimiting device frrther performs the step of:

(4) performing a liveness query for the link delimiting device by ceasing transmission of data on the upstream network link segment, and determining that the link demarcation device is alive if data receives to be received on the upstream network link segment shortly thereafter.

7. The method of monitoring a data network according to claim 6, wherein the link delimiting device further performs the step of:

(5) transmitting an indication to the management system that the link demarcation device is operating correctly in response to determining that the link demarcation device is alive.

* * * * *

UNITED STATES PATENT AND TRADEMARK OFFICE
CERTIFICATE OF CORRECTION

PATENT NO.          : 7,486,623 B2
APPLICATION NO. : 10/845000
DATED                  : February 3, 2009
INVENTOR(S)        : Sills It is certified that error appears in the above-identified patent and that said Letters Patent is hereby corrected as shown below:

On the Title Pg

--Item (57) under "ABSTRACT", Line 3, please delete "LLD" and insert --LDD--

--Item (57) under "ABSTRACT", Line 6, please delete "a" and insert --and second--

--In Column 5, Line 49, please delete "LLD" and insert --LDD--

--In Column 6, Line 33, please delete "componet(s)" and insert --component(s)--

--In Column 7, Line 42, please delete "FIG. 3)" and insert --FIG. 3).--

--In Column 10, Line 16, please delete "LDD" and insert --LLD--

--In Column 10, Line 18, please delete "LLD" and insert --LDD--

--In Column 10, Line 22, please delete "LLD" and insert --LDD--

--In Column 10, Line 22, please delete "LDD" and insert --LLD--

--In Column 11, Line 23, in Claim 1, please delete "(i)" and insert --(j)--

--In Column 11, Line 24, in Claim 1, please delete "erraneous" and insert --erroneous--

--In Column 11, Line 33, in Claim 2, delete "(dl)" and insert --(d1)--

--In Column 12, Line 30, in Claim 5, please delete "netxvork" and insert --network--

--In Column 12, Line 38, in Claim 6, please delete "frrther" and insert --further--

UNITED STATES PATENT AND TRADEMARK OFFICE
CERTIFICATE OF CORRECTION

PATENT NO. : 7,486,623 B2
APPLICATION NO. : 10/845000
DATED : February 3, 2009
INVENTOR(S) : Sills It is certified that error appears in the above-identified patent and that said Letters Patent is hereby corrected as shown below:

--In Column 12, Lines 44-45, in Claim 6, please delete "alive if data received..........................................shortly thereafter." and insert the same in line 43 after "demarcation device is" as a continuation.

Signed and Sealed this

Fifteenth Day of September, 2009

David J. Kappos
*Director of the United States Patent and Trademark Office*